US011775450B2

(12) United States Patent
Ichikawa

(10) Patent No.: US 11,775,450 B2
(45) Date of Patent: *Oct. 3, 2023

(54) MEMORY PROTECTION CIRCUIT AND MEMORY PROTECTION METHOD

(71) Applicant: RENESAS ELECTRONICS CORPORATION, Tokyo (JP)

(72) Inventor: Takashi Ichikawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,607

(22) Filed: Nov. 15, 2022

(65) Prior Publication Data

US 2023/0084922 A1    Mar. 16, 2023

Related U.S. Application Data

(60) Continuation of application No. 17/400,918, filed on Aug. 12, 2021, now Pat. No. 11,526,452, which is a (Continued)

(30) Foreign Application Priority Data

May 25, 2018   (JP) ................................. 2018-100185

(51) Int. Cl.
  *G06F 12/14*    (2006.01)
  *G06F 9/455*    (2018.01)
(52) U.S. Cl.
  CPC ...... *G06F 12/1475* (2013.01); *G06F 9/45558* (2013.01); *G06F 2009/45583* (2013.01)

(58) Field of Classification Search
  None
  See application file for complete search history.

(56) References Cited

U.S. PATENT DOCUMENTS 9,465,750 B2    10/2016   Nakada et al.
10,554,663 B2    2/2020   Ganda
(Continued)

FOREIGN PATENT DOCUMENTS

EP        2 660 752 A2    11/2013
JP       2013-232151 A    11/2013

OTHER PUBLICATIONS

Jithin R et al., "Dynamic Partitioning of Physical Memory Among Virtual Machines", 31st Annual ACM Symposium on Applied Computing, SAC 2016, ACM Press, Apr. 4, 2016, pp. 474-476.
(Continued)

*Primary Examiner* — Yaima Rigol
(74) *Attorney, Agent, or Firm* — McDermott Will & Emery LLP

(57) ABSTRACT

To provide a memory protection circuit and a memory protection method suitable for quick data transfer between a plurality of virtual machines via a common memory, according to an embodiment, a memory protection circuit includes a first ID storing register that stores therein an ID of any of a plurality of virtual machines managed by a hypervisor, an access determination circuit that permits the virtual machine having the ID stored in the first ID storing register to access a memory, a second ID storing register that stores therein an ID of any of the virtual machines, and an ID update control circuit that permits the virtual machine having the ID stored in the second ID storing register to rewrite the ID stored in the first ID storing register.

6 Claims, 7 Drawing Sheets

Related U.S. Application Data division of application No. 16/405,585, filed on May 7, 2019, now Pat. No. 11,119,948.

(56) References Cited

U.S. PATENT DOCUMENTS

| | | |
|---|---|---|
| 10,733,003 B2 | 8/2020 | Sanghvi et al. |
| 2006/0271931 A1 | 11/2006 | Harris et al. |
| 2008/0086729 A1 | 4/2008 | Kondoh et al. |
| 2013/0297901 A1 | 11/2013 | Nakada et al. |
| 2015/0277949 A1 | 10/2015 | Loh et al. |
| 2016/0050113 A1 | 2/2016 | Sridhara et al. |
| 2018/0248700 A1 | 8/2018 | Tsirkin et al. |

OTHER PUBLICATIONS

Extended European Search Report issued in corresponding European Patent Application No. 19175067.8-1218, dated Sep. 11, 2019.
U.S. PTO Non-Final Office Action issued in related parent U.S. Appl. No. 16/405,585, dated Jan. 27, 2021.
U.S. PTO Notice of Allowance issued in related parent U.S. Appl. No. 16/405,585, dated May 17, 2021.
U.S. Appl. No. 16/405,585, dated May 7, 2019.
U.S. PTO Notice of Allowance issued in related parent U.S. Appl. No. 17/400,918 dated Aug. 17, 2022.
U.S. PTO Ex Parte Quayle Action issued in related parent U.S. Appl. No. 17/400,918 dated May 18, 2022.
U.S. Appl. No. 17/400,918 dated Aug. 12, 2021.

FIG. 2

| REWRITE REQUEST ACCESS ID | | CURRENT STATE | | | NEXT STATE | | |
|---|---|---|---|---|---|---|---|
| | | LOCKING SIGNAL | VALUE OF ID STORING REGISTER | | LOCKING SIGNAL | VALUE OF ID STORING REGISTER | |
| VM1 | VM2 | | VM1 | VM2 | | VM1 | VM2 |
| 1 | 0 | 0 | 1 | 0 | 0 | 0 | 1 |
| 0 | 1 | 0 | 1 | 0 | 0 | 0 | 1 |
| 1 | 0 | 0 | 0 | 1 | 0 | 1 | 0 |
| 0 | 1 | 0 | 0 | 1 | 0 | 1 | 0 |

FIG. 3

| CURRENT STATE | | | | | NEXT STATE | |
|---|---|---|---|---|---|---|
| REWRITE REQUEST ACCESS ID | | LOCKING SIGNAL | VALUE OF ID STORING REGISTER | | LOCKING SIGNAL | VALUE OF ID STORING REGISTER |
| VM1 | VM2 | | VM1 | VM2 | | VM1 | VM2 |
| 1 | 0 | 1 | 1 | 0 | 0 | 0 | 1 |
| 0 | 1 | 1 | 1 | 0 | 1 | 1 | 0 |
| 1 | 0 | 1 | 0 | 1 | 1 | 0 | 1 |
| 0 | 1 | 1 | 0 | 1 | 0 | 1 | 0 |

MEMORY PROTECTION CIRCUIT AND MEMORY PROTECTION METHOD

CROSS-REFERENCE TO RELATED APPLICATIONS

This is a Continuation of U.S. patent application Ser. No. 17/400,918 filed on Aug. 12, 2021, which is a Divisional of U.S. patent application Ser. No. 16/405,585 filed on May 7, 2019, now U.S. Pat. No. 11,119,948 issued on Sep. 14, 2021, which claims the benefit of Japanese Patent Application No. 2018-100185 filed on May 25, 2018 including the specification, drawings and abstract is incorporated herein by reference in their entirety.

BACKGROUND

The present invention relates to a memory protection circuit and a memory protection method and, for example, relates to a memory protection circuit and a memory protection method that are suitable for quickly transferring data between a plurality of virtual machines via a common memory.

To prevent invalid access from an arithmetic processing circuit, for example, a CPU (Central Processing Unit) to a memory, a memory protection circuit that controls an access from the CPU to the memory is provided between the CPU and the memory.

By using virtualization technology of making a single physical resource pretend a plurality of resources, it is possible to cause a plurality of virtual machines to operate on a single CPU under control by a hypervisor. However, a mechanism of controlling access from the virtual machines to the memory is required to allow the virtual machines to share a single memory.

A related technique is disclosed in Japanese Unexamined Patent Application Publication No. 2013-232151. A memory protection circuit disclosed in Japanese Unexamined Patent Application Publication No. 2013-232151 only grants a highly reliably hypervisor access to a register that stores therein information on a virtual machine having a right of access to a memory, and does not grant a virtual machine with low reliability access to the register. In this manner, the memory protection circuit disclosed in Japanese Unexamined Patent Application Publication No. 2013-232151 controls access to a common memory by the virtual machines.

SUMMARY

However, when data is transferred between the virtual machines via the common memory, the memory protection circuit disclosed in Japanese Unexamined Patent Application Publication No. 2013-232151 have to, every time access to the memory by any of the virtual machines is completed, cause a process to migrate from that virtual machine to the hypervisor and then switch aright of access to the memory to the next virtual machine in response to a request from the hypervisor.

For example, when data is transferred between two virtual machines via the common memory, a right of access to the memory is given to one of the virtual machines by the hypervisor first. Thereafter, when access to the memory by the one virtual machine is completed, completion of access is notified to the hypervisor from the one virtual machine. In response to this notification, a process migrates from the one virtual machine to the hypervisor. The right of access to the memory is then switched from the one virtual machine to the other by the hypervisor, and thereafter access to the memory is made by the other virtual machine.

Therefore, the memory protection circuit disclosed in Japanese Unexamined Patent Application Publication No. 2013-232151 has a problem that it is not possible to quickly transfer data between the virtual machines via the common memory. Other objects and novel features will be apparent from the description of this specification and the accompanying drawings.

According to an embodiment, a memory protection circuit includes a first ID storing register that stores therein an ID (Identification) of any of a plurality of virtual machines managed by a hypervisor, an access determination circuit that permits the virtual machine having the ID stored in the first ID storing register to access a memory, a second ID storing register that stores therein an ID of any of the virtual machines, and an ID update control circuit that permits the virtual machine having the ID stored in the second ID storing register to rewrite the ID stored in the first ID storing register.

According to another embodiment, a memory protection method stores an ID (Identification) of any of a plurality of virtual machines managed by a hypervisor in a first ID storing register, stores an ID of any of the virtual machines in a second ID storing register, permits the virtual machine having the ID stored in the second ID storing register to rewrite the ID stored in the first ID storing register, and permits the virtual machine having the ID stored in the first ID storing register to access a memory.

According to the embodiments, it is possible to provide a memory protection circuit and a memory protection method that can quickly transfer data between a plurality of virtual machines via a common memory.

BRIEF DESCRIPTION OF THE DRAWINGS

FIG. 2 illustrates a relationship between an ID of a virtual machine that has issued an ID rewrite request and an ID stored in a first ID storing register, in a case where the ID stored in the first ID storing register is not locked.

FIG. 3 illustrates a relationship between an ID of a virtual machine that has issued an ID rewrite request and an ID stored in the first ID storing register, in a case where the ID stored in the first ID storing register is locked.

DETAILED DESCRIPTION

Figure 1:
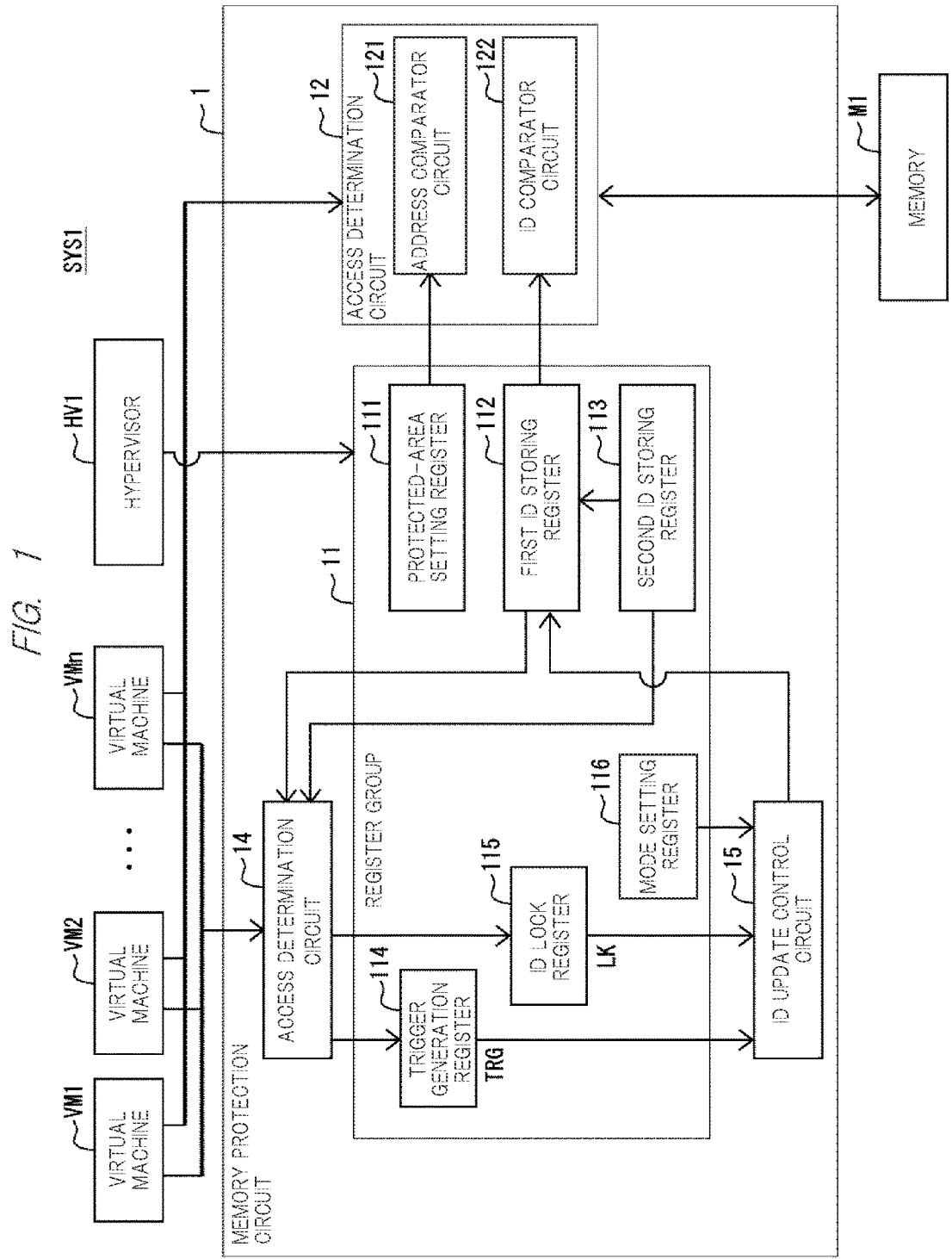
FIG. 1 is a block diagram illustrating a configuration example of a memory protection system according to a first embodiment.

For clarifying explanation, omission and simplification are made in the following description and the drawings as appropriate. Each of components illustrated in the drawings as functional blocks performing various processes can be configured by a CPU (Central Processing Unit), a memory, or another circuit if being achieved by hardware, and can be implemented by a program loaded to a memory if being implemented by software. Therefore, a person skilled in the art would understand that these functional blocks can be implemented by hardware only, software only, or a combination of hardware and software in various ways, and implementation is not limited to any of them. Throughout the drawings, the same component is labeled with the same reference sign, and redundant description is omitted as necessary.

The above-described program can be stored in various types of non-transitory computer-readable media to be supplied to a computer. The non-transitory computer-readable media include various types of tangible recording media Examples of the non-transitory computer-readable medium include a magnetic recording medium (for example, a flexible disk, a magnetic tape, and a hard disk drive), a magneto-optical recording medium (for example, a magneto-optical disk), a CD-ROM (Read Only Memory), a CD-R, a CD-R/W, and a semiconductor memory (for example, a mask ROM, a PROM (Programmable ROM), an EPROM (Erasable ROM), a flash ROM, and a RAM (Random Access Memory)). Also, the program may be supplied to the computer by various types transitory computer-readable media Examples of the transitory computer-readable medium include an electric signal, an optical signal, and an electromagnetic wave. The transitory computer-readable medium can supply the program to the computer via a wired communication path, such as an electric wire and an optical fiber, or a wireless communication path.

<Previous Study by Inventors>

Before a memory protection system according to a first embodiment is described, the content of previous study by the inventors is described.

Figure 7:
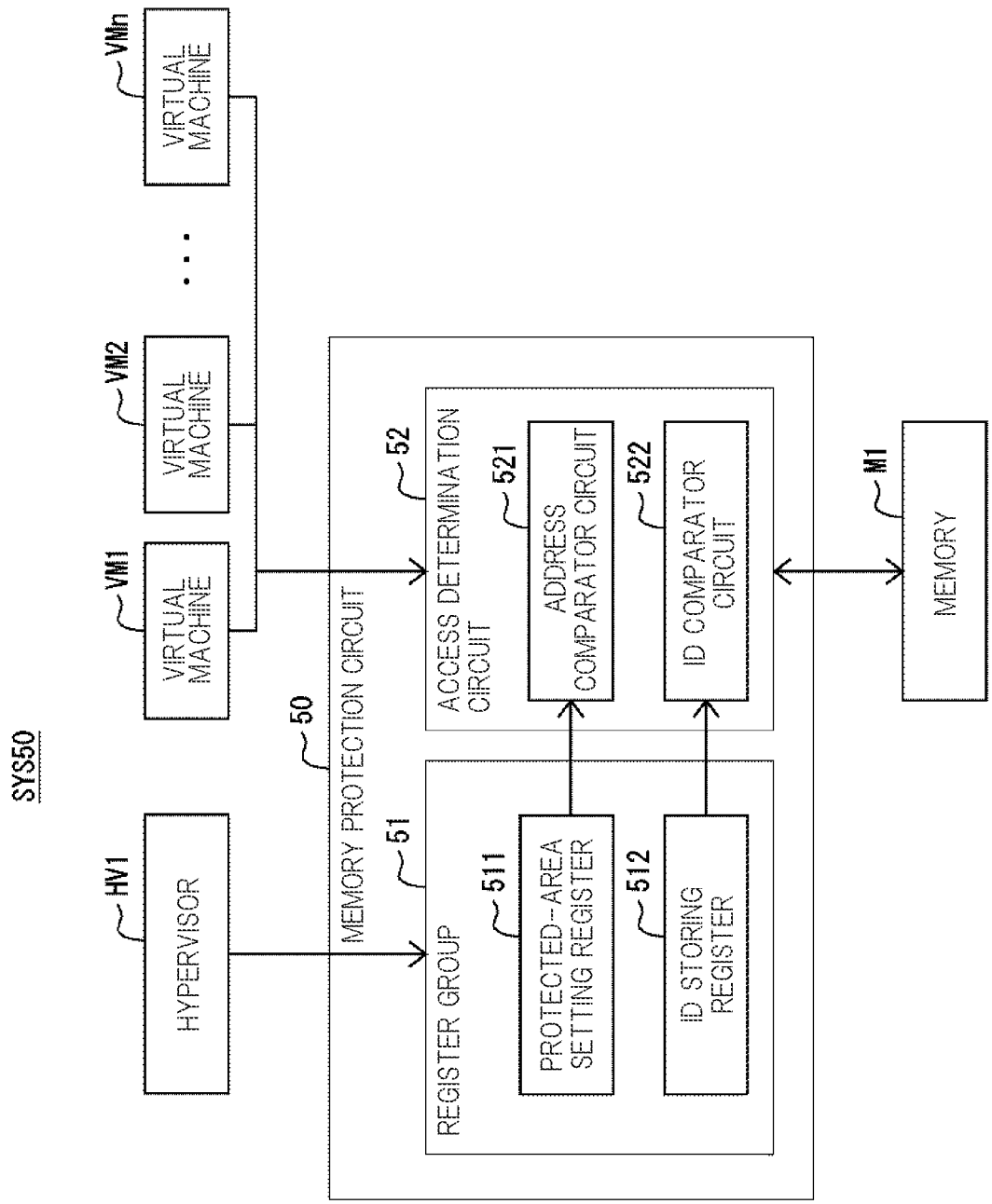
FIG. 7 is a block diagram illustrating a configuration example of a memory protection system according to a concept before the first embodiment.

FIG. 7 is a block diagram illustrating a configuration example of a memory protection system SYS50 according to a concept before the first embodiment.

As illustrated in FIG. 7, the memory protection system SYS50 includes n (n is an integer of 2 or more) virtual machines VM1 to VMn and a hypervisor HV1 that are achieved by an arithmetic processing circuit, such as a CPU, a memory protection circuit 50, and a memory M1. Hereinafter, any of the virtual machines VM1 to VMn may be referred as a virtual machine VM.

The hypervisor HV1 has higher reliability than the virtual machines VM1 to VMn and manages these virtual machines VM1 to VMn. The hypervisor HV1 has a right of access to each register provided in the memory protection circuit 50. Although the virtual machines VM1 to VMn can perform arithmetic processes in parallel, they do not have aright of access to each register provided in the memory protection circuit 50.

The memory protection circuit 50 controls access by the virtual machines VM1 to VMn to the memory M1. Specifically, the memory protection circuit 50 includes a register group 51 and an access determination circuit 52.

The register group 51 includes a protected-area setting register 511 and an ID storing register 512. In the protected-area setting register 511, a storage area of the memory M1, which is to be protected against access by the virtual machines VM1 to VMn, is set. The ID storing register 512 stores therein an ID (Identification) of a virtual machine VM of the virtual machines VM1 to VMn, to which a right of access to the memory M1 is given.

When receiving a request of access to the memory M1 from any virtual machine VM of the virtual machines VM1 to VMn, the access determination circuit 52 determines whether to permit the virtual machine VM that has issued the access request to access to the memory M1.

Specifically, the access determination circuit 52 includes an address comparator circuit 521 and an ID comparator circuit 522. The address comparator circuit 521 compares an address in the memory M1 specified by the virtual machine VM that has issued the access request and an address in the storage area set in the protected-area setting register 511 with each other. The ID comparator circuit 522 compares the ID of the virtual machine VM that has issued the access request and the ID stored in the ID storing register 512 with each other. The access determination circuit 52 permits the virtual machine VM that has issued the access request to access the memory M1, when the result of comparison by the access comparator circuit 521 indicates matching and the result of comparison by the ID comparator circuit 522 indicates matching.

When data is transferred between two virtual machines VM1 and VM2 via the common memory M1, for example, a right of access to the memory M1 is given to the virtual machine VM1 by the hypervisor HV1 in the memory protection circuit 50, first. Specifically, an ID of the virtual machine VM1 is stored into the ID storing register 512 by the hypervisor HV1. Thus, data is written into the memory M1 by the virtual machine VM1, for example.

Thereafter, when access to the memory M1 by the virtual machine VM1 is completed, completion of access is notified to the hypervisor HV1 from the virtual machine VM1. In response to this notification, a process migrates from the virtual machine VM1 to the hypervisor HV1. Thereafter, the right of access to the memory M1 is switched from the virtual machine VM1 to the virtual machine VM2 by the hypervisor HV1. Specifically, the ID stored in the ID storing register 512 is rewritten from the ID of the virtual machine VM1 to an ID of the virtual machine VM2 by the hypervisor HV1. Thus, data written into the memory M1 is read by the virtual machine VM2, for example.

As described above, in the memory protection circuit 50, when data is transferred via the common memory M1 between the two virtual machines VM1 and VM2, for example, k is necessary to, every time access to the memory M1 by any of the virtual machines is completed, cause a process to migrate from that virtual machine to the hypervisor and then switch the right of access to the memory M1 to the next virtual machine in response to a request from the hypervisor. Therefore, the memory protection circuit 50 has a problem that it is not possible to quickly transfer data between a plurality of virtual machines via a common memory.

Further, it is necessary to develop software for the hypervisor for performing this series of processes. Furthermore, because a memory access process by a context switch occurs in transition from a virtual machine to the hypervisor and transition from the hypervisor to a virtual machine, a cycle of processing by an arithmetic processing circuit, such as a CPU, becomes longer, resulting in increase of time from completion of a data communication process by one of the virtual machines to start of a data communication process by the next virtual machine.

Therefore, the inventors have found a memory protection circuit according to the first embodiment, which enables quick data transfer between a plurality of machines via a common memory.

First Embodiment

FIG. 1 is a block diagram illustrating a configuration example of a memory protection system SYS1 in which a memory protection circuit according to the first embodiment is provided.

As illustrated in FIG. 1, the memory protection system SYS1 includes n (n is an integer of 2 or more) virtual machines VM1 to VMn and the hypervisor HV1 that are achieved by an arithmetic processing circuit, such as a CPU, a memory protection circuit 1, and the memory M1. Hereinafter, any of the virtual machines VM1 to VMn may be referred as a virtual machine VM.

The hypervisor HV1 has higher reliability than the virtual machines VM1 to VMn and manages these virtual machines VM1 to VMn. The hypervisor HV1 has a right of access to each of registers (a protected-area setting register 111, a first ID storing register 112, a second ID storing register 113, and a mode setting register 116) provided in the memory protection circuit 1. Although the virtual machines VM1 to VMn can perform arithmetic processes in parallel, aright of access to the memory protection circuit 1 is limited.

The memory protection circuit 1 controls access by the virtual machines VM1 to VMn to the memory M1. Specifically, the memory protection circuit 1 includes a register group 11, an access determination circuit 12, an access determination circuit 14, and an ID update control circuit 15.

The register group 11 includes the protected-area setting register 111, the first ID storing register 112, the second ID storing register 113, a trigger generation register 114, an ID lock register 115, and the mode setting register 116.

In the protected-area setting register 111, a storage area in the memory M1, which is to be protected against access by the virtual machines VM1 to VMn, is set. The first ID storing register 112 stores therein an ID (Identification) of a virtual machine VM of the virtual machines VM1 to VMn, to which a right of access to the memory M1 is given. The second ID storing register 113, the trigger generation register 114, the ID lock register 115, and the mode setting register 116 will be described later.

When receiving a request of access to the memory M1 from any virtual machine VM of the virtual machines VM1 to VMn, the access determination circuit 12 determines whether to permit the virtual machine VM that has issued the access request to access to the memory M1.

Specifically, the access determination circuit 12 includes an address comparator circuit 121 and an ID comparator circuit 122. The address comparator circuit 121 compares an address in the memory M1 specified by the virtual machine VM that has issued the access request and an address in a storage area set in the protected-area setting register 111 with each other. The ID comparator circuit 122 compares the ID of the virtual machine VM that has issued the access request and the ID stored in the ID storing register 112 with each other. The access determination circuit 12 permits the virtual machine VM that has issued the access request to access the memory M1, when the result of comparison by the access comparator circuit 121 indicates matching and the result of comparison by the ID comparator circuit 122 indicates matching.

In the register group 11, the second ID storing register 113 stores therein IDs of two virtual machines VM to which a right of access to the first ID storing register 112 is given. In other words, the second ID storing register 113 stores therein IDs of two virtual machines VM to which a right of rewriting the ID stored in the first ID storing register 112 is given.

When a request of rewriting the ID stored in the first ID storing register 112 has been issued from any virtual machine VM of the virtual machines VM1 to VMn to the memory protection circuit 1 (m other words, change of a virtual machine VM having a right of access to the memory M1 has been requested), the access determination circuit 14 determines whether to permit the virtual machine VM that has issued the ID rewrite request to rewrite the ID stored in the first ID storing register 112.

For example, when the ID of the virtual machine VM that has issued the ID rewrite request and any of two IDs stored in the second ID storing register 113 match each other, the access determination circuit 14 permits the virtual machine VM that has issued the ID rewrite request to rewrite the ID stored in the first ID storing register 112. At this time, the trigger generation generator 114 outputs a pulse-like trigger signal TRG. When the trigger signal TRG has been output, the ID update control circuit 15 rewrites the ID stored in the first ID storing register 112 from one of the two IDs stored in the second ID storing register 113 to the other.

For example, the first ID storing register 112 has a 32-bit width ID storing area corresponding to 32 virtual machines VM1 to VM32. In the 32-bit width ID storing area, a value of the lowermost bit represents the presence or absence of a right of access to the memory M1 by the virtual machine VM1, and a value of the 32-th bit from the lowermost bit (that is, a value of the uppermost bit) represents the presence or absence of a right of access to the memory M1 by the virtual machine VM32, for example.

Similarly, the second ID storing register 113 has a 32-bit width ID storing area corresponding to the 32 virtual machines VM1 to VM32. In the 32-bit width ID storing area, a value of the lowermost bit represents the presence or absence of a right of rewriting an ID by the virtual machine VM1, and a value of the 32-th bit from the lowermost bit (that is, a value of the uppermost bit) represents the presence or absence of a right of rewriting an ID by the virtual machine VM32, for example.

In a case where a right of access to the memory M1 is given to the virtual machine VM1 and a right of rewriting the ID stored in the first ID storing register 112 is given to the virtual machines VM1 and VM2, for example, values of lower four bits of the first ID storing register 112 are "0001" and values of lower four bits of the second ID storing register 113 are "0011". Because values of upper 28 bits are all 0 in the present example, those are omitted in the following description.

When the trigger signal TRG has been output in response to the ID rewrite request, the ID update control circuit 15 calculates an exclusive OR of each bit of a 32-bit width value stored in the first ID storing register 112 and each bit of a 32-bit width value stored in the second ID storing register 113, and overwrites it in the first ID storing register 112. Specifically, the ID update control circuit 15 overwrites a value "0010" that is an exclusive OR of each bit of the lower four bits "0001" in the first ID storing register 112 and each bit of the lower four bits "0011" in the second ID storing register 113, in the first ID storing register 112. Thus, a virtual machine having a right of access to the memory M1 migrates from the virtual machine M1 to the virtual machine VM2.

Further, when a request of locking the ID stored in the first ID storing register 112 has been issued from any virtual machine VM of the virtual machines VM1 to VMn to the memory protection circuit 1, the access determination circuit 14 determines whether to permit the virtual machine VM that has issued the ID lock request to lock the ID stored in the first ID storing register 112.

For example, when the ID of the virtual machine VM that has issued the ID lock request and the ID stored in the first ID storing register 112 match each other, the access determination circuit 14 permits that virtual machine VM to lock the ID stored in the first ID storing register 112. At this time, the ID lock register 115 makes a lock signal LK active.

When the lock signal LK becomes active, the ID update control circuit 15 locks the ID stored in the first ID storing register 112. Thus, the ID stored in the first ID storing register 112 cannot be rewritten until lock is released.

Furthermore, when a request of rewriting the ID stored in the first ID storing register 112 has been issued from the virtual machine VM having the locked ID, that rewrite request is accepted. At this time, the ID lock register 115 switches the lock signal LK from an active state to an inactive state. Thus, lock is released. At the same time, the ID update control circuit 15 rewrites the ID stored in the first ID storing register 112 from one of the two IDs stored in the second ID storing register 113 to the other.

Therefore, before data is written into the memory M1 by the virtual machine VM1 having a right of access to the memory M1, the right of access to the memory M1 migrates from the virtual machine VM1 to the virtual machine VM2, and thereafter data reading from the memory M1 by the virtual machine VM2 is completed, it is possible to prevent migration of a right of access to the memory M1 from the virtual machine VM2 to the virtual machine VM1, for example.

FIG. 2 illustrates a relationship between an ID of a virtual machine VM that has issued an ID rewrite request and an ID stored in the first ID storing register 112, in a case where the ID stored in the first ID storing register 112 is not locked. It is assumed that a right of rewriting the ID stored in the first ID storing register 112 is given to the virtual machines VM1 and VM2 in the example of FIG. 2.

Referring to FIG. 2, in a case where the ID stored in the first ID storing register 112 is not locked, when an ID rewrite request has issued from any of the virtual machines VM1 and VM2, the ID stored in the first ID storing register 112 is rewritten from an ID of one of the virtual machines VM1 and VM2 to an ID of the other.

FIG. 3 illustrates a relationship between an ID of a virtual machine VM that has issued an ID rewrite request and an ID stored in the first ID storing register 112, in a case where the ID stored in the first ID storing register 112 is locked. It is assumed that a right of rewriting the ID stored in the first ID storing register 112 is given to the virtual machines VM1 and VM2 in the example of FIG. 3.

Referring to FIG. 3, in a case where the ID stored in the first ID storing register 112 is locked, only when an ID rewrite request has issued from the virtual machine VM of which ID is stored in the first ID storing register 112, the ID stored in the first ID storing register 112 is rewritten from an ID of one of the virtual machines VM1 and VM2 to an ID of the other. Further, when the ID is rewritten, lock is released at the same time.

In the mode setting register 116, it is set whether to activate an operation mode in which the ID stored in the first ID storing register is rewritten in response to a rewrite request from the virtual machine VM having the ID stored in the second ID storing register 113 (hereinafter, referred to as an operation mode MD). The operation mode MD is set to be active in the present embodiment. When the operation mode MD is set to be inactive, the memory protection circuit 1 performs a similar operation to that of the memory protection circuit 50, for example.

<Operation of Memory Protection Circuit 1>

Next, an operation of the memory protection circuit 1 is described. In this example, a case is described in which data is transferred between the virtual machines VM1 and VM2 via the common memory M1.

First, initial setting is performed by the hypervisor HV1 for each register in the memory protection circuit 1. For example, an ID of the virtual machine VM1 is stored into the first ID storing register 112. Thus, a right of access to the memory M1 is given to the virtual machine VM1. In the second ID storing register 113, two IDs of the virtual machines VM1 and VM2 are stored. Thus, aright of rewriting the ID stored in the first ID storing register 112 is given to the virtual machines VM1 and VM2. In the protected-area setting register 111, a storage area of the memory M1 to which the virtual machines VM1 and VM2 make access. Further, the mode setting register 116 is set to make the operation mode MD active.

After performing initial setting for each register of the memory protection circuit 1, the hypervisor HV1 starts the virtual machine VM1 having aright of access to the memory M1.

The virtual machine VM1 having a right of access to the memory M1 mites data into the memory M1, for example. At this time, the virtual machine VM1 may request the memory protection circuit 1 to lock the ID stored in the first ID storing register 112. Lock of the ID can prevent migration of a right of access to the memory M1 from the virtual machine VM1 to the virtual machine VM2 before completion of data writing by the virtual machine VM1 to the memory M1.

Upon completion of data writing to the memory M1, the virtual machine VM1 requests the memory protection circuit 1 to rewrite the ID stored in the first ID storing register 112. When the trigger signal TRG has been output from the trigger generation register 114 in response to the ID rewrite request, the ID update control circuit 15 rewrites the ID stored in the first ID storing register 112 from the ID of the virtual machine VM1 to the ID of the virtual machine VM2. Thus, aright of access to the memory M1 migrates from the virtual machine M1 to the virtual machine VM2. At this time, the lock signal LK output from the ID lock register 115 becomes inactive. Thus, lock of the ID stored in the first ID storing register 112 is released.

Thereafter, the virtual machine VM1 notifies the virtual machine VM2 of interruption to cause the virtual machine VM2 to start.

The virtual machine VM2 having aright of access to the memory M1 reads cut data written in the memory M1, for example. At this time, the virtual machine VM2 may request the memory protection circuit 1 to lock the ID stored in the first ID storing register 112. Lock of the ID can prevent migration of a right of access to the memory M1 from the virtual machine VM2 to the virtual machine VM1 before completion of data reading from the memory M1 by the virtual machine VM2.

Upon completion of data reading from the memory M1, the virtual machine VM2 requests the memory protection circuit 1 to rewrite the ID stored in the first ID storing register 112. When the trigger signal TRG has been output from the bigger generation register 114 in response to the ID rewrite request, the ID update control circuit 15 rewrites the ID stored in the first ID storing register 112 from the ID of the virtual machine VM2 to the ID of the virtual machine VM1. Thus, a right of access to the memory M1 migrates from the virtual machine VM2 to the virtual machine VM1. At this time, the lock signal LK output from the ID lock register 115 becomes inactive. Thus, lock of the ID stored in the first ID storing register 112 is released.

Thereafter, the virtual machine VM2 notifies the virtual machine VM1 of interruption to cause the virtual machine VM1 to start. These operations are repeated.

As described above, in a case where data is transferred between two virtual machines via a common memory, the memory protection circuit 1 can cause a process to directly migrate from one of the virtual machines to the other without causing the process to migrate from the one virtual machine to a hypervisor even after completion of access to the memory M1 by the one virtual machine. That is, the memory protection circuit 1 enables quick data transfer between the two virtual machines via the common memory M1 without using the hypervisor HV1.

Further, for the memory protection circuit 1, it is not necessary to develop software for rewriting an ID stored in the first ID storing register 112 in response to a request from the hypervisor HV1, unlike the memory protection circuit 50. Therefore, it is possible to reduce man-hour.

Furthermore, to perform data communication between two virtual machines, a right of access to the memory M1 is given to either one of the two virtual machines VM only. In addition, migration of a virtual machine VM having a right of access to the memory M1 is only permitted by a request from the two virtual machines VM. That is, access to a storage area in the memory M1 that is to be protected is made by the two virtual machines only, and therefore it is also possible to protect data against another resource.

<Modification of Memory Protection Circuit 1>

Although the present embodiment has described a case where the memory protection circuit 1 is configured to allow data transfer between the two virtual machines VM1 and VM2 via the common memory M1 in the memory protection circuit 1, the configuration of the memory protection circuit 1 is not limited thereto. The memory protection circuit 1 may be configured to allow data transfer can be performed among three or more virtual machines via the common memory M1. A modification of the memory protection circuit 1 is briefly described below as a memory protection circuit 1a.

Figure 4:
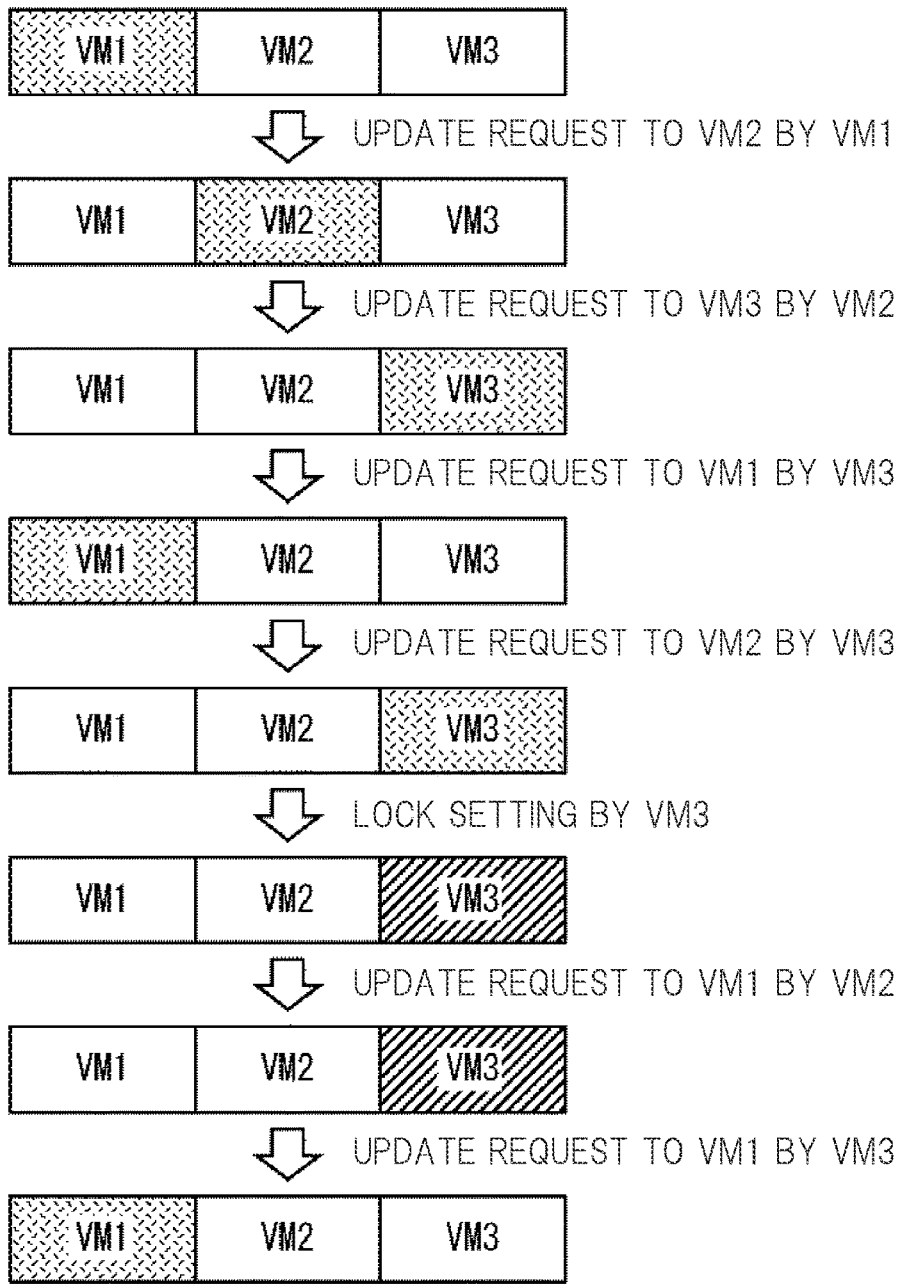
FIG. 4 explains an operation of a modification of the memory protection system illustrated in FIG. 1.

FIG. 4 is an explanatory diagram of an operation example of the memory protection circuit 1a. In example of FIG. 4, data is transferred among three virtual machines VM1 to VM3 via the common memory M1.

In the second ID storing register 113, respective IDs of the virtual machines VM1 to VM3 are stored. That is, in this modification, it is possible to rewrite an ID stored in the first ID storing register 112 in response to an ID rewrite request from the virtual machines VM1 to VM3.

First, a right of access to the memory M1 is given to the virtual machine VM1 in the example of FIG. 4. When the virtual machine VM1 has requested the memory protection circuit 1a to rewrite the ID stored in the first ID storing register 112 from the ID of the virtual machine VM1 to the ID of the virtual machine VM2, the ID stored in the first ID storing register 112 is rewritten from the ID of the virtual machine VM1 to the ID of the virtual machine VM2. Thus, aright of access to the memory M1 migrates from the virtual machine M1 to the virtual machine VM2.

Next, when the virtual machine VM2 has requested the memory protection circuit 1a to rewrite the ID stored in the first ID storing register 112 from the ID of the virtual machine VM2 to the ID of the virtual machine VM3, the ID stored in the first ID storing register 112 is rewritten from the ID of the virtual machine VM2 to the ID of the virtual machine VM3. Thus, a right of access to the memory M1 migrates from the virtual machine VM2 to the virtual machine VM3.

Next, when the virtual machine VM3 has requested the memory protection circuit 1a to rewrite the ID stored in the first ID storing register 112 from the ID of the virtual machine VM3 to the ID of the virtual machine VM1, the ID stored in the first ID storing register 112 is rewritten from the ID of the virtual machine VM3 to the ID of the virtual machine VM1. Thus, a right of access to the memory M1 migrates from the virtual machine VM3 to the virtual machine VM1.

Next, when the virtual machine VM3 having no right of access to the memory M1 has requested the memory protection circuit 1a to rewrite the ID stored in the first ID storing register 112 from the ID of the virtual machine VM1 to the ID of the virtual machine VM2, the ID stored in the first ID storing register 112 is not rewritten from the ID of the virtual machine VM1 to the ID of the virtual machine VM2. In this case, the ID stored in the first ID storing register 112 is rewritten to the ID of the virtual machine VM3 that has accessed, for example. Thus, a right of access to the memory M1 migrates from the virtual machine VM1 to the virtual machine VM3.

Next, when the virtual machine VM3 having a right of access to the memory M1 has accessed and requested the memory protection circuit 1a to lock the ID stored in the first ID storing register 112 (that is, the ID of the virtual machine VM3), the ID stored in the first ID storing register 112 is locked.

At this time, even if the virtual machine VM2 having no right of access to the memory M1 has requested the memory protection circuit 1a to rewrite the ID stored in the first ID storing register 112 from the ID of the virtual machine VM3 to the ID of the virtual machine VM1, the ID stored in the first ID storing register 112 is not rewritten from the ID of the virtual machine VM3 to the ID of the virtual machine VM1 because it is locked. That is, the ID stored into the first ID storing register 112 is kept to be the ID of the virtual machine VM3. Thus, a right of access to the memory M1 is kept in the virtual machine VM3.

Meanwhile, when the virtual machine VM3 having a right of access to the memory M1 has requested the memory protection circuit 1a to rewrite the ID stored in the first ID storing register 112 from the ID of the virtual machine VM3 to the ID of the virtual machine VM1, lock of the ID stored in the first ID storing register 112 is released, so that the ID stored in the first ID storing register 112 is rewritten from the ID of the virtual machine VM3 to the ID of the virtual machine VM1. Thus, a right of access to the memory M1 migrates from the virtual machine VM3 to the virtual machine VM1.

A right of access to the memory M1 is specified to migrate to any of the virtual machines VM1 to VM3 of which IDs are stored in the second ID storing register 113, by a virtual machine having a right of access to the memory M1. The ID of a virtual machine VM that is specified as a destination of migration of aright of access to the memory M1 is stored in the trigger generation register 114, for example. Then, when the ID stored in the trigger generation register 114 and any of the three IDs stored in the second ID storing register 113 match each other, the ID stored in the first ID storing register 112 is rewritten into the ID stored in the trigger generation register 114. However, as already described, when a destination of migration is specified by a virtual machine having no right of access to the memory M1, the ID stored in the fast ID storing register 112 is rewritten into the ID of a virtual machine that has requested migration of a right of access, for example, in place of the ID stored in the trigger generation register 114.

As described above, the memory protection circuit 1a can quickly transfer data among three or more virtual machines via the common memory M1 without using a hypervisor.

Second Embodiment

Figure 5:
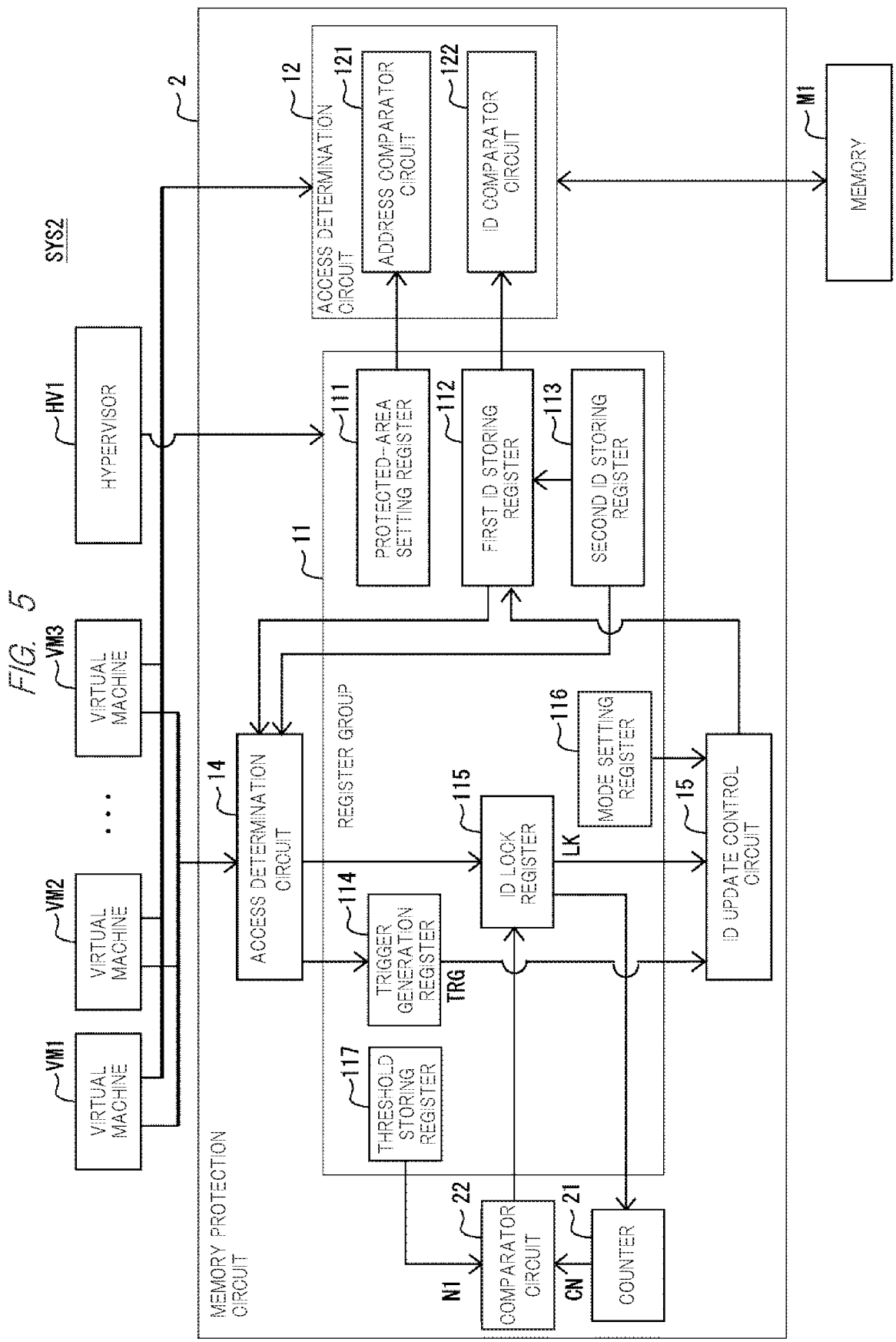
FIG. 5 is a block diagram illustrating a configuration example of a memory protection system according to a second embodiment.

FIG. 5 is a block diagram illustrating a configuration example of a memory protection system SYS2 according to a second embodiment. When being compared with the memory protection system SYS1, the memory protection system SYS2 includes a memory protection circuit 2 in place of the memory protection circuit 1. The memory protection circuit 2 further includes a counter 21, a comparator circuit 22, and a threshold storing register 117, when being compared with the memory protection circuit 1.

The threshold storing register 117 stores therein a predetermined threshold value specified by the hypervisor HV1. The counter 21 starts an operation of counting up its count value CN that has zero as an initial value in synchronization with a timing at which the lock signal LK output from the ID lock register 115 becomes active (e.g, an H level) (that is, at a timing at which the ID stored in the first ID storing register 112 is locked).

The comparator circuit 22 compares the count value CN of the counter 21 and a threshold value N1 stored in the threshold storing register 117 with each other. When the count value CN has reached the threshold value N1 after a predetermined time from start of counting up by the counter 21, the comparator circuit 22 switches the result of comparison from an inactive state to an active state (for example, from an L level to an H level). Thus, the lock signal LK output from the ID lock register 115 is forcibly switched from an active state to an inactive state, and therefore lock of the ID stored in the first ID storing register 112 is released. That is, even in a case where the ID stored in the first ID storing register 112 continues to be locked unintentionally, for example, because of a system error, lock of that ID is forcibly released after a predetermined time from start of lock. Further, by switching the comparison result from an inactive state to an active state, rewiring of the ID stored in the first ID storing register 112 can be performed simultaneously with release of the lock.

The other configuration of the memory protection circuit 2 is the same as that of the memory protection circuit 1, and therefore the description thereof is omitted.

<Operation of Memory Protection Circuit 2>

Figure 6:
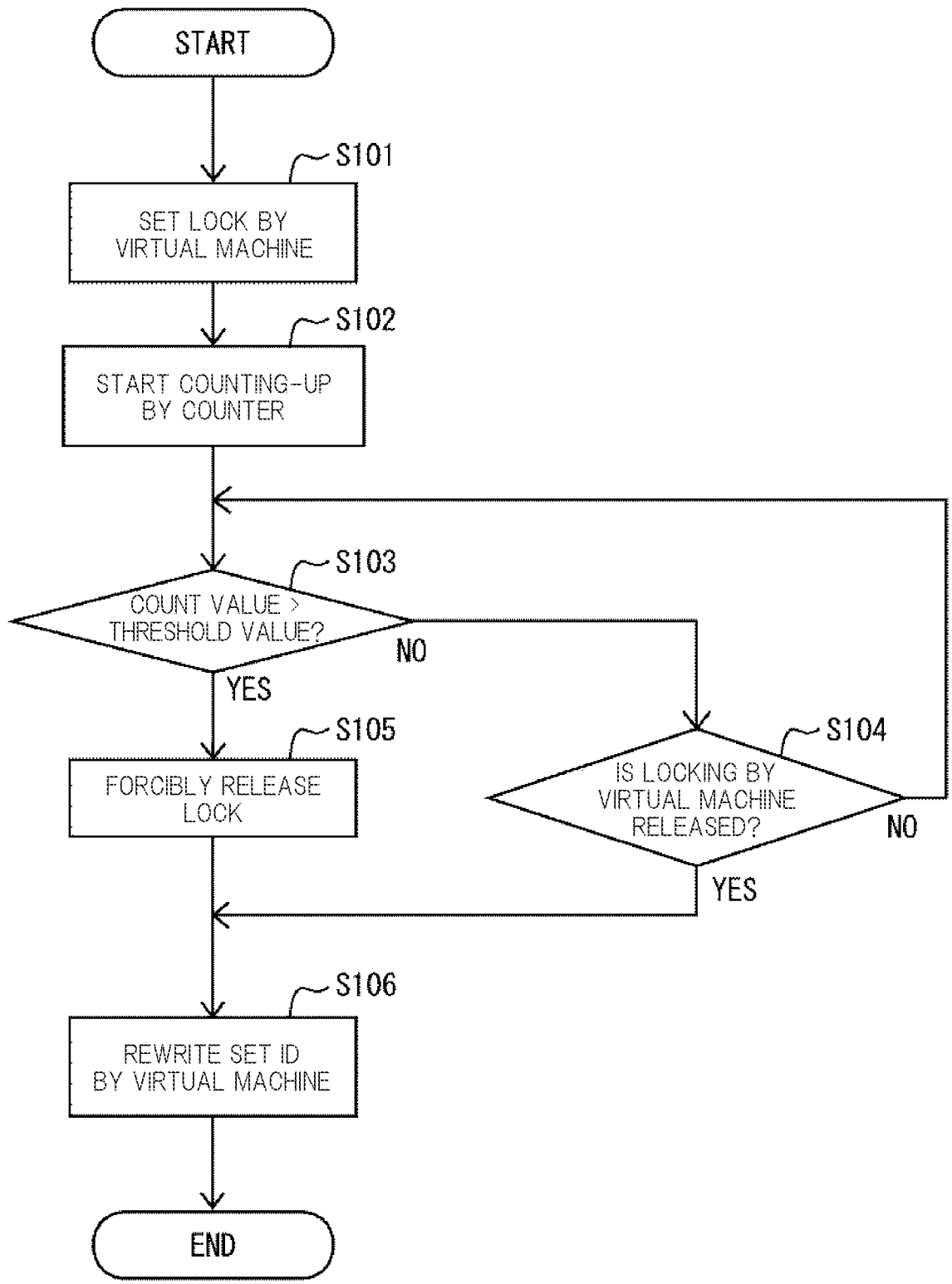
FIG. 6 is a flowchart illustrating an operation of a memory protection circuit provided in the memory protection system illustrated in FIG. 5.

Next, an operation of the memory protection circuit 2 is described, referring to FIG. 6.

FIG. 6 is a flowchart illustrating the operation of the memory protection circuit 2.

As illustrated in FIG. 6, first, when a virtual machine VM having an ID stored in the first ID storing register 112 (that is, a virtual machine VM to which aright of access to the memory M1 is given) has accessed and requested the memory protection circuit 2 to lock the ID stored in the first ID storing register 112, the ID lock register 115 switches the lock signal LK from an inactive state to an active state (for example, from an L level to an H level). Thus, the ID stored in the first ID storing register 112 is locked (Step S101).

The counter 21 starts an operation of counting up its count value CN that represents zero as an initial value, at a timing at which the ID stored in the first ID storing register 112 is locked (Step S102).

For example, when lock of the ID stored in the first ID storing register 112 is released in response to an ID rewrite request from the virtual machine VM having that ID (YES at Step S104) before the count value CN reaches the threshold value N1 (NO at Step S103), rewriting of the ID stored in the fast ID storing register 112 is performed simultaneously with release of the lock (Step S106). At this time, the count-up operation by the counter 21 is stopped, and the count value CN is initialized to zero.

On the other hand, unless lock of the ID stored in the first ID storing register 112 is released (NO at Step S104) before the count value CN reaches the threshold value N1 (NO at Step S103), the operation of counting up the count value CN by the counter 21 is continued.

Then, when the count value CN has reached the threshold value N1 (YES at Step S103), the lock signal LK output from the ID lock register 115 is forcibly switched from an active state to an inactive state even if there is no ID rewrite request from the virtual machine VM of which the ID is stored in the first ID storing register 112. Thus, lock of the ID stored in the first ID storing register 112 is released (Step S105). That is, also in a case where the ID stored in the first ID storing register 112 continues to be locked unintentionally, for example, because of a system error, lock of that ID is forcibly released after a predetermined time from start of lock.

In this case, in response to a request from the virtual machine having the ID stored in the first ID storing register 112, that ID is rewritten as necessary (Step S106).

As described above, the memory protection circuit 2 according to the present embodiment can obtain the same or approximately the same advantageous effects as those of the memory protection circuit 1. Further, the memory protection circuit 2 according to the present embodiment releases lock of an ID stored in the first ID storing register 112 after a predetermined time from lock of the ID stored in the first ID storing register 112, even if there is no request from a virtual machine VM having the ID stored in the first ID storing register 112. Therefore, even in a case where the ID stored in the first ID storing register 112 continues to be locked unintentionally, for example, because of a system error, the memory protection circuit 2 according to the present embodiment forcibly release lock of that ID after a predetermined time has passed from start of lock, thereby enabling setting of the memory protection circuit 2 to return to a normal state.

Further, the memory protection circuit 2 according to the present embodiment forcibly releases lock of an ID on the basis of a result of comparison by the comparator circuit 22 without a process by the hypervisor HV1. Therefore, saving of context for starting the hypervisor HV1 and a resume operation by the hypervisor HV1 are not required, so that performance degradation of the memory protection system SYS2 is suppressed.

As described above, when data is transferred between a plurality of virtual machines via a common memory, the memory protection circuits 1 and 2 according to the above first and second embodiments can cause a process to migrate from any one of the virtual machines to the next virtual machine without causing a process to migrate from the one virtual machine to a hypervisor after completion of access to the memory M1 by the one virtual machine. That is, the memory protection circuit 1 enables quick data transfer between the virtual machines via the common memory M1 without using the hypervisor HV1.

In the above, the invention made by the inventors of the present application has been specifically described by way of the embodiments. However, it is naturally understood that the present invention is not limited to the aforementioned embodiments, and can be changed in various ways within the scope not departing from the gist thereof.

What is claimed is:

1. A memory protection circuit comprising:
   a first ID storing register that stores an ID (Identification) of any of a plurality of virtual machines managed by a hypervisor;
   an access determination circuit that permits the virtual machine having the ID stored in the first ID storing register to access a memory; and a second ID storing register that stores an ID of any of the virtual machines, wherein the virtual machine having the ID stored in the second ID storing register is permitted to rewrite the ID stored in the first ID storing register, and wherein when the ID stored in the first ID storing register is rewritten, the virtual machine having the rewritten ID is permitted to access the memory without a migration to the hypervisor.

2. The memory protection circuit according to claim 1, wherein the hypervisor has an access permission to rewrite the ID stored in the first ID storing register.

3. The memory protection circuit according to claim 1, wherein the access determination circuit further configured to:

lock the first ID storing register when a lock request is issued by the virtual machine whose access request is permitted, and rewrite the first ID when a rewrite request is issued by the virtual machine whose rewrite request is permitted and the first ID storing register is unlocked.

4. The memory protection circuit according to claim 3, wherein when the first ID storing register is locked and a change request is issued by the virtual machine whose access request is permitted, the first ID storing register is unlocked.

5. The memory protection circuit according to claim 1, wherein the memory is shared by the plurality of virtual machines.

6. The memory protection circuit according to claim 1, wherein the first ID storing register stores a first ID of one of the virtual machines, wherein the second ID storing register stores the first ID and a second ID of the other of the virtual machines, and wherein after the one of the virtual machines writes data to the memory and rewrites the second ID to the second ID storing register, the other of the virtual machines is permitted to read the data stored in the memory without the migration to the hypervisor.

* * * * *